(12) United States Patent
Foussard et al.

(10) Patent No.: US 9,558,317 B2
(45) Date of Patent: Jan. 31, 2017

(54) SYSTEM AND METHOD FOR LIMITING THE ENGINE TORQUE OF A FOUR-WHEEL-DRIVE VEHICLE

(75) Inventors: Francois Foussard, Versailles (FR); Alessandro Monti, La Garenne Colombes (FR); Richard Pothin, Jouars Pontchartrain (FR); Nicolas Romani, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 434 days.

(21) Appl. No.: 13/640,199

(22) PCT Filed: Apr. 7, 2011

(86) PCT No.: PCT/FR2011/050790
§ 371 (c)(1),
(2), (4) Date: Nov. 27, 2012

(87) PCT Pub. No.: WO2011/124857
PCT Pub. Date: Oct. 13, 2011

(65) Prior Publication Data
US 2013/0066534 A1 Mar. 14, 2013

(30) Foreign Application Priority Data
Apr. 9, 2010 (FR) ...................................... 10 52705

(51) Int. Cl.
*G06F 19/00* (2011.01)
*B60K 28/16* (2006.01)
*B60W 10/06* (2006.01)
*B60W 10/119* (2012.01)
*B60W 30/18* (2012.01)
*B60W 30/184* (2012.01)

(52) U.S. Cl.
CPC ............. *G06F 19/00* (2013.01); *B60K 28/165* (2013.01); *B60W 10/06* (2013.01); *B60W 10/119* (2013.01);
(Continued)

(58) Field of Classification Search
CPC ......... B62D 6/008; B62D 6/002; B62D 6/003; B62D 6/007; B62D 7/159; B60T 8/1755; G06F 19/00; B60K 28/165; B60W 10/06; B60W 10/119; B60W 30/18172; B60W 30/1843; B60W 28/16; B60W 2510/0291; B60W 2510/0638; B60W 2510/1005; B60W 2520/28; B60W 2710/0666; B60W 2710/0672
(Continued)

(56) References Cited

U.S. PATENT DOCUMENTS 5,677,840 A * 10/1997 Futawatari ........... B60K 28/165
180/197
6,493,622 B1 12/2002 Erban
(Continued)

FOREIGN PATENT DOCUMENTS

EP 1 327 547 7/2003

OTHER PUBLICATIONS

International Search Report Issued Jun. 20, 2011 in PCT/FR11/50790 Filed Apr. 7, 2011.

*Primary Examiner* — Sizo Vilakazi
(74) *Attorney, Agent, or Firm* — Oblon, McClelland, Maier & Neustadt, L.L.P.

(57) ABSTRACT

A system for limiting engine torque of a four-wheel-drive motor vehicle, including an actuator that is controlled and configured to distribute the engine torque to the drive wheels, a computer calculating at least one variable characteristic of an operation of the vehicle, and a module for limiting the engine torque. In addition, the limitation system includes a mechanism for deactivating the module for limiting the engine torque according to the variable characteristic of the operation of the engine.

15 Claims, 7 Drawing Sheets

(52) U.S. Cl.
CPC .... *B60W 30/1843* (2013.01); *B60W 30/18172* (2013.01); *B60K 28/16* (2013.01); *B60W 2510/0291* (2013.01); *B60W 2510/0638* (2013.01); *B60W 2510/1005* (2013.01); *B60W 2520/28* (2013.01); *B60W 2710/0666* (2013.01); *B60W 2710/0672* (2013.01)

(58) Field of Classification Search
USPC ....... 123/319, 351, 352, 361, 406.23; 701/1, 701/36, 41, 43, 70, 72, 82, 84, 88, 90, 91, 92, 701/93, 97, 102, 107, 110
See application file for complete search history.

(56) References Cited

U.S. PATENT DOCUMENTS

| | | | | |
|---|---|---|---|---|
| 8,428,836 | B2* | 4/2013 | Andrasko | F02D 41/021 701/54 |
| 8,620,565 | B2* | 12/2013 | Kadolph | F02B 37/013 123/568.16 |
| 2003/0151381 | A1* | 8/2003 | Kadota | B60W 20/15 318/465 |
| 2004/0211609 | A1* | 10/2004 | Schmitt | B60K 28/16 180/197 |
| 2004/0249518 | A1* | 12/2004 | Okoshi | B60K 6/445 701/1 |
| 2005/0029034 | A1* | 2/2005 | Stervik | B60W 10/06 180/248 |
| 2005/0165532 | A1* | 7/2005 | Post | F02D 41/021 701/84 |
| 2005/0205344 | A1* | 9/2005 | Uryu | B62D 5/0484 180/446 |
| 2006/0155452 | A1* | 7/2006 | Strenkert | B60W 10/06 701/54 |
| 2007/0039770 | A1 | 2/2007 | Barrette et al. | |
| 2009/0318265 | A1 | 12/2009 | Ginther | |
| 2011/0006591 | A1* | 1/2011 | Yoshii | B60T 7/12 303/4 |
| 2014/0121931 | A1* | 5/2014 | Kellum | B60K 28/10 701/93 |

* cited by examiner

SYSTEM AND METHOD FOR LIMITING THE ENGINE TORQUE OF A FOUR-WHEEL-DRIVE VEHICLE

The present invention is situated in the technical field of transmissions for motor vehicles and more particularly in the field of the control of transmissions of four-wheel-drive vehicles.

Four-wheel-drive vehicles have a high fuel consumption and poor road performance. For some years, new vehicles with integral transmission however have had improved performance. These vehicles are characterized by a variable torque transfer between the front drive axle system and the rear drive axle system. A precise control of this type of transmission makes it possible to reconcile performance and safety both on-road and off-road.

These vehicles notably use a system for distributing longitudinal forces to the four wheels, said system being based for example on the use of a coupler. Such a system has a maximum capacity for transmitting the engine torque to the rear axle system and has three different operating modes.

A first transmission mode corresponds to a transmission of a variable portion of the maximum capacity of engine torque to the rear axle system and corresponds to a coupler that is called "controlled". It is used in an automatic four-wheel-drive operating mode called "automatic 4×4 mode".

A second transmission mode corresponds to a transmission of the totality of the maximum capacity of engine torque to the rear axle system and corresponds to a coupler called "closed". It is used in an off-road four-wheel-drive operating mode called "off-road 4×4 mode".

Finally, a third mode corresponds to an absence of transmission of engine torque to the rear axle system and corresponds to a coupler called "open". It is used in a two-wheel-drive operating mode called "4×2 mode".

A four-wheel-drive motor vehicle comprises selection means that can be actuated by the user for selecting the operating mode of the system between the three modes, "4×2", "automatic 4×4" or "off-road 4×4".

It often happens that, when a vehicle is driven off-road, the metering of the accelerator pedal is very difficult with respect to the driving condition (slope, grip on the road or on the ground, load). In this case, it may happen that the front axle system of the traction vehicle begins to slip. The controlled four-wheel-drive system reacts by coupling the rear axle system to the front axle system in order to reduce the speed difference between the two axle systems. If the engine torque demanded by the driver is too great relative to the torque that can pass through the 4×4 device, the front axle system continues to slip with respect to the rear axle system. The drivability is then greatly reduced. Moreover, the 4×4 device heats up more and more until it opens completely while cancelling the engine torque transmitted to the rear axle system. The vehicle then operates in 4×2 mode instead of the required 4×4.

The object of the invention is to alleviate these drawbacks and to propose a secure engine torque limitation device that is as transparent as possible for the driver, rapid and effective.

More particularly, the object of the present invention is to provide a system and a method for controlling a torque-transfer actuator capable of taking account of the driving situation and the state of the 4×4 system in order to limit the engine torque of the vehicle in order to maximize the obstacle-overcoming and drivability capabilities of a vehicle furnished with a 4×4 system and the availability of the controlled 4×4 system, notably for inexpert drivers.

The subject of the invention is therefore, according to a first aspect, a system for limiting the engine torque of a motor vehicle with a four-wheel-drive traction system, comprising an actuator controlled and configured to distribute the engine torque to the drive wheels, computing means for computing at least one variable characteristic of the operation of the vehicle, and a module for limiting the engine torque as a function of said variables.

According to a general feature of this system, the engine torque limitation module comprises means for generating an engine torque limitation setpoint designed to actuate it, and means for deactivating the engine torque limitation module as a function of the variables characteristic of the operation of the engine.

Preferably, the input signals of the engine torque limitation module used to generate the setpoint and to activate or deactivate the torque limitation are characteristic of the driving situation on the one hand and of the operating state of the four-wheel-drive system of the vehicle on the other hand. The driving situation may be characterized by the engine torque demanded by the driver, the speed of the vehicle, the engine speed, the ratio engaged or else the speed difference between the front axle system and the rear axle system.

The state of the 4×4 system may be characterized by the operating mode of the 4×4 system, the setpoint of torque to be transmitted, or the temperature of the 4×4 actuator. Engine torque limitation is possible only in four-wheel-drive mode, a specific programming being necessary for it to be possible in two-wheel-drive mode.

Advantageously, the engine torque limitation system returns control to the driver progressively by virtue of a mechanism limiting the torque variations over time. This mechanism for limiting the torque variations over time may be a function of the temperature of the actuator. At low temperature, the comfort and the ability to overcome obstacles have preference and at high temperature, the behavior and the availability of the actuator have preference.

Means for processing the input signals are configured to filter the input signals, in order to generate filtered signals of Boolean type, and to determine notably the engaged gearbox transmission ratio intended for the setpoint-generation means. First-order low-pass filters are notably used to eliminate any high-frequency noise of variables such as the speed of the rear axle system, the rotation speed of the engine, the speed of the vehicle, or else the engine torque demanded by the driver. Moreover, the filtered speed of the rear axle system and the filtered speed of rotation of the engine may be used to estimate the engaged gearbox ratio.

Preferably, the deactivation means are capable of generating a first deactivation signal for an immediate deactivation of the engine torque limitation module and a second deactivation signal for a progressive deactivation of the engine torque limitation module. In order to improve the feel of the driver, provision can be made, as a function of the seriousness of a failure, to deactivate the engine torque limitation module immediately or progressively. Naturally, if there is no failure, the module is activated. Engine torque limitation is for example deactivated progressively for engine speed values that are too low, or for example when the vehicle speed exceeds a certain threshold value.

Advantageously, the setpoint-generation means comprises a module for detecting the limitation conditions which is capable of delivering control signals for activation and deactivation of the limitation modules and a setpoint-generation module capable of generating an engine torque setpoint signal.

For example, the module for detecting the limitation conditions is capable of delivering control signals as a function of the value of the variables characteristic of the operation of the vehicle and activation and deactivation signals.

A further subject of the invention, according to a second aspect, is a method for limiting the engine torque of a motor vehicle with a four-wheel-drive traction system and comprising an actuator controlled and configured to distribute the engine torque to the drive wheels, wherein at least one variable characteristic of the operation of the vehicle is computed and the engine torque is limited as a function of said variables.

In one embodiment, an engine torque limitation setpoint is generated that is intended for the actuator as a function of the first variables characteristic of the operation of the vehicle and of variables representative of the operating state of the traction system, and the engine torque limitation module is deactivated as a function of the second variables characteristic of the operation of the engine.

In one advantageous embodiment, an immediate deactivation or a progress deactivation of the engine torque limitation is carried out Provision can be made for the variations in the engine torque to be limited progressively over time as a function of the temperature of the actuator.

It is also possible, according to another feature of this method, to process the input signals in order to determine the engaged gearbox transmission ratio for the generation of the setpoint.

Other advantages and features of the invention will appear on examination of the detailed description of a nonlimiting embodiment, and of the appended drawings, in which:

FIG. 1 shows an electronic control system fitted to a four-wheel-drive vehicle.

Figure 1:
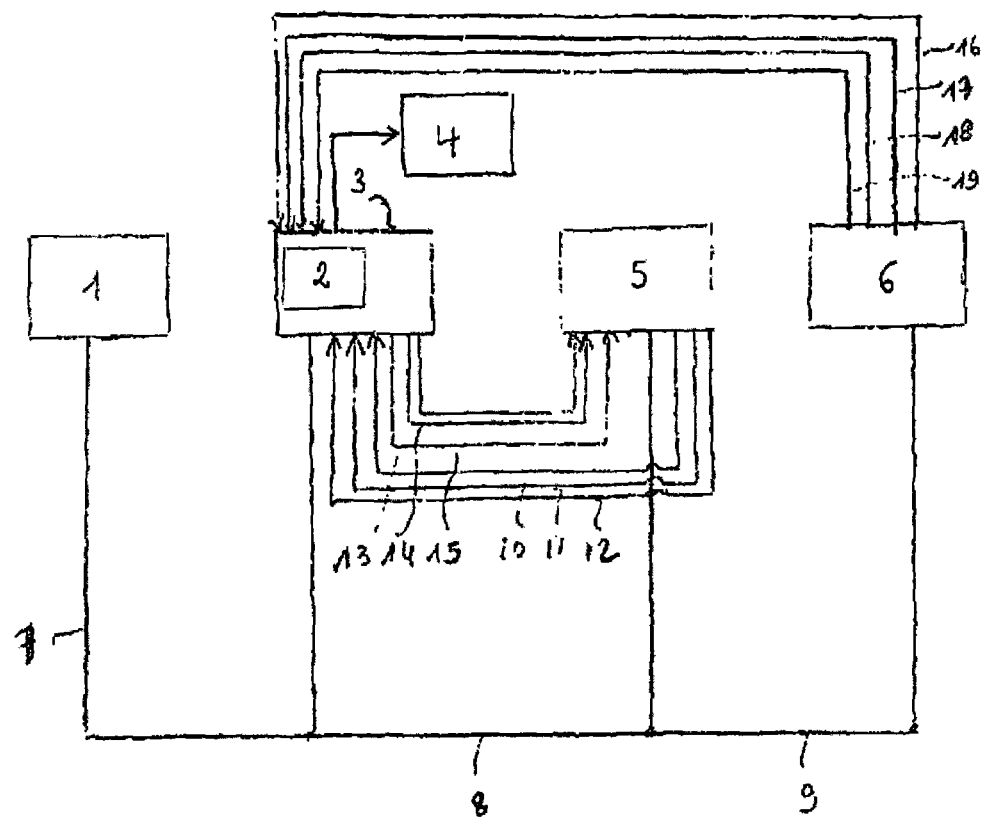
FIG. 1 illustrates an electronic control system according to the invention.

The control system illustrated comprises means 1 for determining the operating characteristics of the vehicle, a means 3 for controlling the actuator, an engine torque limitation means 2 included in the control means 3, a torque transfer actuator 4 designed to distribute the engine torque to the drive wheels of the vehicle, an engine control means 5 and an ABS computer 6.

This control system notably uses a data interchange between the engine control means 5 (ECM) which controls the heat engine or electric motor of the vehicle and the actuator control means 3 (ETC) via a data bus (a CAN network).

The determination means 1 in this instance are connected to the actuator control means 3 by the connection 7, to the engine control means 5 by the connection 8 and to the ABS computer 6 by the connection 9. The determination means 1 may comprise physical sensors or computing means capable of determining variables characteristic of the operation of the vehicle based on a model and on data supplied by other sensors.

The actuator control means 3 is in this instance connected at the output to the engine control means 5 via the connections 10 to 12 and at the input via the connections 13 to 15. The ABS computer 6 is connected at the input to the actuator control means 3 by the connections 16 to 19.

The determination means 1 transmit notably to the actuator control means 3, to the engine control mean 5 and to the ABS computer 6 signals relating notably to the engine speed EngineSpeed, to the engine torque requested by the driver DriverEngineTorqueReq, to the speed of the front right wheel WheelSpeed_FR, to the speed of the front left wheel WheelSpeed_FL, to the speed of the rear right wheel WheelSpeed_RR, to the speed of the rear left wheel WheelSpeed_RL, to the speed of the vehicle VehicleSpeed.

The actuator control means 3 transmits to the engine control means 5 a clock signal ETC_Clock via the connection 13 making it possible to verify that the information is updated. If the counter is not updated regularly, the actuator control means 3 immediately deactivates the engine torque limitation module 2.

The actuator control means 3 transmits to the engine control means 5 an engine torque setpoint ETL_EngTorqueReq via the connection 14 and an engine torque limitation request signal ETL_TorqueReductionReq via the connection 15 which, when it is not valid, leads to an absence of application of the engine torque limitation by the engine control means 5.

The engine control means 5 transmits to the actuator control means 3 a signal relating to the engine speed EngineSpeed via the connection 10, to the torque requested by the driver DriverEngineTorqueReq via the connection 11, a clock signal ECM_Clock via the connection 12 to verify the updating of the information and a signal of acknowledgement of engine torque limitation ECM_TorqueAck via the connection 12 which, if it is not valid, leads to an immediate deactivation of the engine torque limitation module 2. When the clock signal ECM_Clock is not updated regularly, the actuator control means 3 immediately deactivates the engine torque limitation module 2. The ABS computer 6 is connected at the input to the actuator control means and transmits to the actuator control means 3 the speeds of the four drive wheels WheelSpeed_FR, WheelSpeed_FR, WheelSpeed_RL, WheelSpeed_FL via the connections 16 to 19. Thus, for safety reasons, several items of information are interchanged between the two control means 3 and 5 in order to ensure the robustness of the engine torque limitation strategy.

Figure 2:
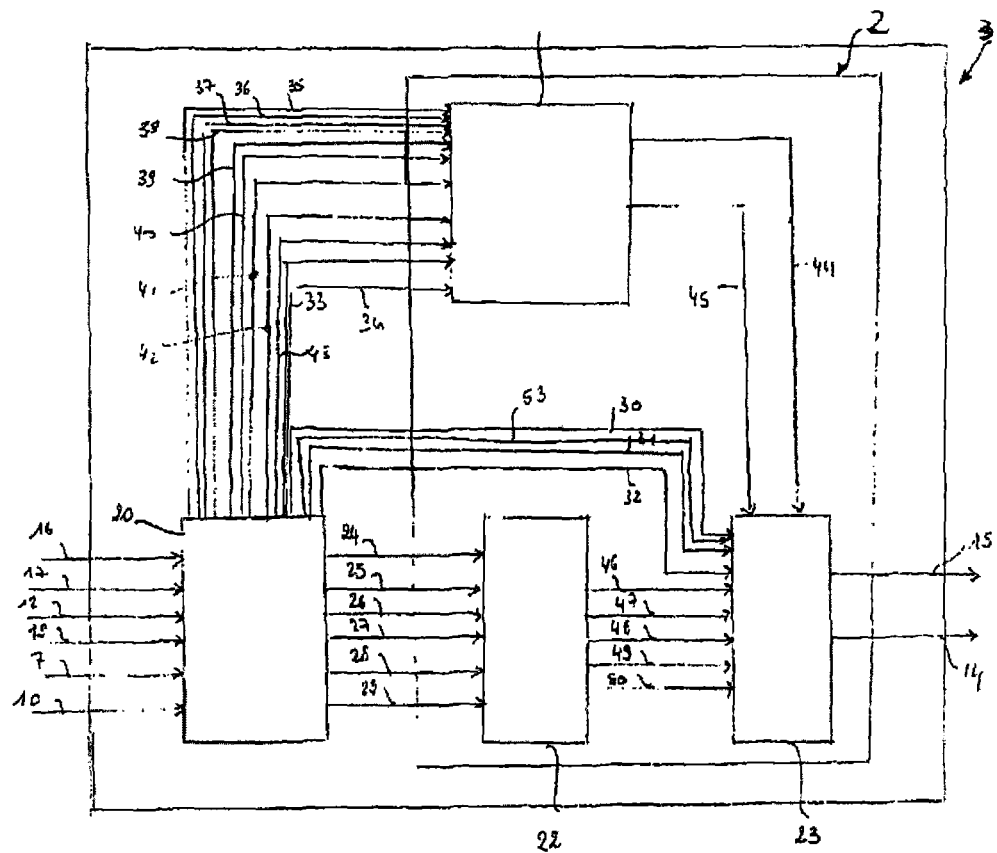
FIG. 2 illustrates a means for controlling the actuator according to the invention.

FIG. 2 represents the actuator control means 3 comprising the engine torque limitation module 2 making it possible to generate the engine torque setpoint ETL_EngTorqueReq transmitted to the engine control means 5 via the connection 14 and the engine torque limitation request signal ETL_TorqueReductionReq via the connection 15. The actuator control means 3 comprises a first general module 20, a second module 21 for the activation/deactivation of the engine torque limitation module 2, a third module 22 for filtering the input signals, and a fourth module 23 for determining the engine torque setpoint ETL_EngTorqueReq. The second, third and fourth modules 21, 22 and 23 form the engine torque limitation means 2.

The first module 20 notably receives at the input the engine torque requested by the driver DriverEngineTorqueReq originating from the determination means 1 via the connection 7, the engine speed EngineSpeed originating from the engine control means 5 via the connection 10, the speeds of the four wheels WheelSpeed_FR, WheelSpeed_RR, WheelSpeed_RL, WheelSpeed_FL originating from the ABS computer 6 respectively via the connections 16 to 19. The first module 20, connected at the input to the engine torque limitation module 2, transmits the signals relating to the speeds of the four wheels WheelSpeed_FR, WheelSpeed_RR, WheelSpeed_RL, WheelSpeed_FL to the engine speed EngineSpeed and the engine torque requested by the driver DriveEngineTorqueReq respectively via the connections 24 to 29, the signals relating to the mode of the system (automatic four-wheel-drive mode, two-wheel-drive mode or four-wheel-drive mode with maximum transfer of torque to the non-driving axle) ETC_Mode via the connection 30, to the estimate of the controlled 4×4 actuator temperature ETC_ActTemp via the connection 31 and to the setpoint for transfer of torque to the non-driving axle ETC_TorqueDemand via the connection 32.

Moreover, it transmits two requests for external deactivation of the engine torque limitation module 2, one being progressive ETL_ExtSlowDeactivation with a variation of the engine torque limited over time and the other immediate ETL_ExtFastDeactivation respectively via the connections 33 and 34.

The first module 20 also transmits to the engine torque limitation means 2 logic values of validity of the signals relating to the speed of the four wheels S_WheelSpeedRR, S_WheelSpeedFR, S_WheelSpeedRL, S_WheelSpeedFL, to the engine speed S_EngineSpeed, to the system mode S_ETC_Mode, to the actuator temperature S_ETC_ActTemp, to the setpoint for transfer of torque to the non-driving axle S_ETC_TorqueDemand, to the engine torque requested by the driver S_DriverEngineTorqueReq respectively via the connections 35 to 43. If the signal originating from the data bus takes the "false" logic value, or if the value of the signal originating from the data bus is outside a certain permitted range, the corresponding logic value of validity is immediately set at 1 and otherwise it remains at 0. This method is applied to all the signals originating from the data bus. Moreover, plausibility checks can be carried out.

The second module 21 for activation/deactivation of the engine torque limitation module 2 is connected at the output to the first module 20 via the connections 33 to 43 and receives the logic values of validity of the signals relating to the speed of the four wheels S_WheelSpeedRR, S_WheelSpeedFR, S_WheelSpeedRL, S_WheelSpeedFL, to the engine speed S_EngineSpeed, to the system mode S_ETC_Mode, to the actuator temperature S_ETC_ActTemp, to the setpoint for transfer of torque to the non-driving axle S_ETC_TorqueDemand, to the engine torque requested by the driver S_DriverEngineTorqueReq respectively via the connections 35 to 43 and the signals for external deactivation ETL_ExtSlowDeactivation and ETL-ExtFastDeactivation respectively via the connections 33 and 34. It transmits at the output a Boolean immediate deactivation signal ETL_SevereDeactivation and a progressive deactivation signal ETL_LightDeactivation to the fourth module 23 for determining the engine torque setpoint respectively via the connections 44 and 45. An exemplary embodiment will be described in a subsequent figure.

The third module 22 is connected at the output to the first module 22 via the connections 24 to 29 and receives at the input the signals relating to the speeds of the four wheels WheelSpeed_RR, WheelSpeed_RR, WheelSpeed_FL, WheelSpeed_FL, to the engine speed EngineSpeed and the engine torque requested by the driver DriverEngineTorqueReq respectively via the connections 24 to 29. It filters certain of these input signals with the aid of first-order low-pass filters. In particular, it estimates the engaged gearbox ratio GearBoxRatio and the speed of the vehicle VehicleSpeed. It transmits the filtered signals FltVehicleSpeed, FltDriverEngineTorqueReq, FltEngineSpeed, FltFrRrWheelSlip, and the engaged gearbox ratio GearBoxRatio to the fourth module 23 for determining the engine torque setpoint respectively via the connections 46 to 50. An exemplary embodiment of the third module 22 will be described in a subsequent figure.

The fourth module 23 is connected at the output to the first, second and third modules 20, 21 and 22 and receives at the input the signals relating to the deactivation originating from the second module 21 via the connections 44 and 45, the filtered signals and the engaged gearbox ratio originating from the third module 22 via the connections 46 to 50 and the input signals relating to the estimate of the controlled 4×4 actuator temperature ETC_ActTemp via the connection 30, to the system mode ETC_Mode via the connection 31 and to the setpoint for transfer of torque to the non-driving axle ETC_TorqueDemand via the connection 32 originating from the first module 20. As a function of these inputs, it generates two output signals for transmission to the engine control means 5, a first output signal relating to the engine torque setpoint ETL_EngTorqueReq, and a logic value for requesting engine torque limitation ETL_TorqueReductionReq respectively via the connections 14 and 15.

Figure 3:
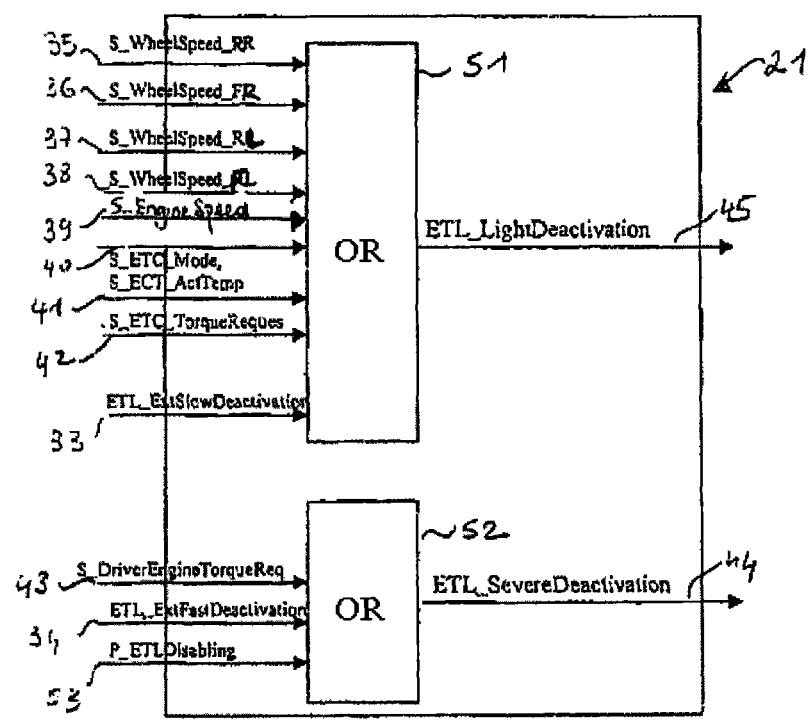
FIG. 3 illustrates an exemplary embodiment of the module for activation/deactivation of the means for controlling the actuator according to the invention.

FIG. 3 illustrates an exemplary embodiment of the second module 21. It comprises a first logic "OR" module 51 connected at the output to the first module 20 via the connections 33 and 35 to 42 and receiving at the input the logic values of validity relating to the speeds of the wheels S_WheelSpeedRR, S_WheelSpeedFR, S_WheelSpeedRL and S_WheelSpeedFL, to the engine speed S_EngineSpeed, to the system mode S_ETC_Mode, to the estimate of the temperature of the controlled 4×4 actuator S_ETC_ActTemp, to the setpoint for transfer of torque to the non-driving axle S_ETC_TorqueRequest respectively via the connections 35 to 42 and the signal relating to the request for external deactivation of the engine torque limitation module 2 ETL_ExtSlowDeactivation via the connection 33. The first logic "OR" module 51 generates at the output a signal relating to a progressive deactivation ETL_LightDeactivation intended for the fourth module 23 via the connection 45.

The second module 21 also comprises a second logic "OR" module 52 receiving at the input the logic value of validity relating to the engine torque requested by the driver S_DriverEngineTorqueReq via the connection 43, the signal relating to the external request for immediate deactivation of the engine torque ETL_ExtFastDeactivation via the connection 34 and the signal relating to a deactivation carried out by calibration tools P_ETLDisabling via the connection 53. It generates at the output a Boolean signal relating to an immediate deactivation ETL_SevereDeactivation intended for the fourth module 23 via the connection 44.

The first logic "OR" module 51 carries out a logic operation of the "OR" type between the various Boolean signals received at the input of the module. When the logic value relating to the system mode S_ETCMode is not zero, that is to say that there is no certainty concerning the system mode, or when at least one logic value relating to the speed of a wheel, S_WheelSpeedRR for example, is not zero, that is to say that at least one item of information on the speed of the wheels is considered to be erroneous, or when the Boolean signal relating to a progressive external deactivation ETL_ExtSlowDeactivation is not zero, that is to say that a minor failure has been revealed by the actuator control means 3, such as for example a failure of the communication protocol between the actuator control means and the instrument panel, the Boolean signal, at the output of the first logic "OR" module 51, relating to a progressive deactivation ETL_LightDeactivation will be a non-zero Boolean signal indicating that the engine torque limitation module must be stopped and may be deactivated progressively.

The second logic "OR" module 52 carries out a logic operation of the "OR" type between the three Boolean signals received at the input of the module. When the logic value of the signal relating to the engine torque requested by the driver S_DriverEngineTorqueReq is not zero, or when the Boolean signal relating to the calibration tools is not zero or when the Boolean signal relating to an immediate external deactivation ETL_ExtFastDeactivation is not zero, that is to say that a serious failure has been revealed such as for example a failure of the communication protocol between the actuator control means 3 and the actuator control means 5, the Boolean signal, at the output of the second logic module 52, relating to an immediate deactivation ETL_SevereDeactivation will be a non-zero Boolean signal indicating that the engine torque limitation module must absolutely be stopped immediately. Thus, the engine torque limitation is protected because it can be deactivated immediately or progressively depending on the failure and/or the driving situation.

Figure 4:
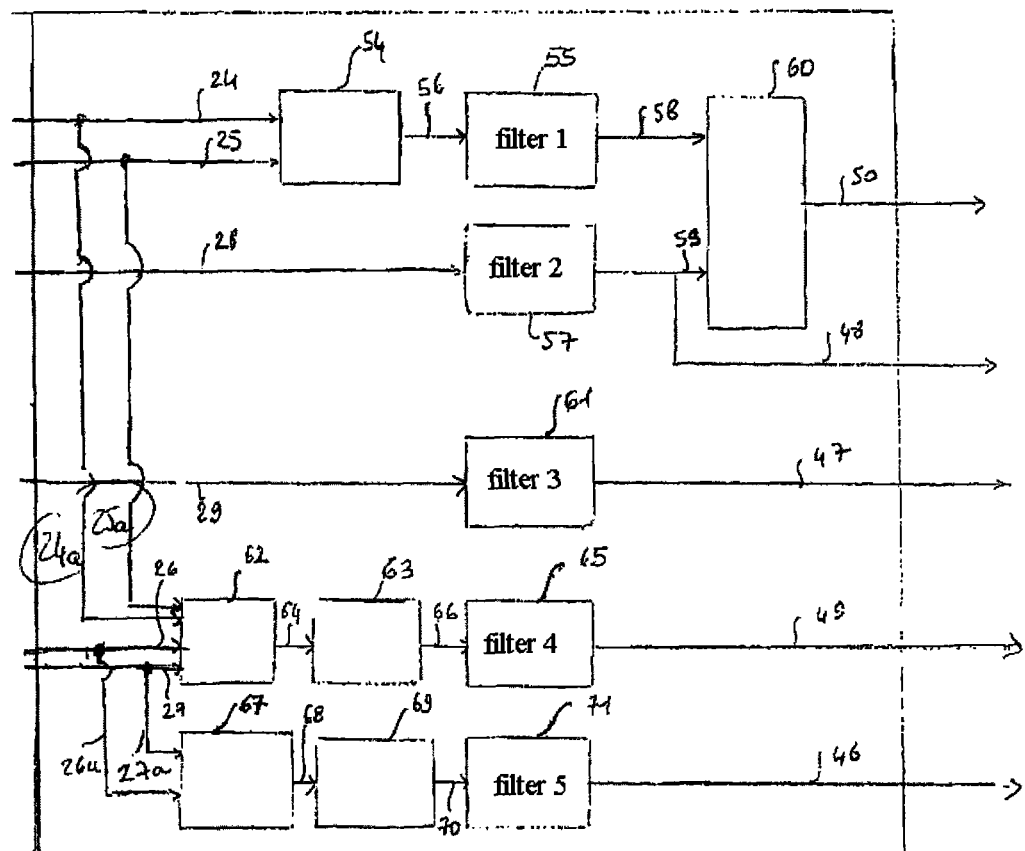
FIG. 4 illustrates an exemplary embodiment of the module for filtering the means for controlling the actuator according to the invention.

FIG. 4 shows an exemplary embodiment of the third module 22. A first module 54 for computing a mean receives at the input the speeds of the front wheels WheelSpeed_FR and WheelSpeed_FL via the connections 24 and 25 and transmits at the output the mean of these speeds to a first first-order low-pass filter 55 via the connection 56. The first filter 55 generates the filtered speed of the front axle system of the vehicle FltFrontAxleSpeed, in order to eliminate any high-frequency noise. A second first-order low-pass filter 57 filters the rotation speed of the engine EngineSpeed received via the connection 28 and transmits a filtered signal relating to the engine speed FltEngineSpeed to the fourth module 23 via the connection 48.

The results at the output of the first and second filters 55 and 57 form the input signals respectively via the connections 58 and 59 of a module for determining the gearbox ratio 60 of which an exemplary embodiment will be explained in detail in a subsequent figure. The module for determining the gearbox ratio determines the engaged gearbox ratio GearBoxRatio and transmits it to the fourth module 23 via the connection 50.

A third first-order low-pass filter 61 filters the signal relating to the engine torque requested by the driver DriverEngineTorqueReq received via the connection 29 in order to eliminate any high-frequency noise and transmits at the output the filtered signal FltDriverEngineTorqueReq to the fourth module 23 via the connection 47. A second computing module 62 receives at the input the four speeds of the wheels WheelSpeed_FR, WheelSpeed_FL, WheelSpeed_RR, WheelSpeed_RL via the connections 24*a*, 25*a*, 26 and 27 and produces the mean of the difference in speed of the front axle system and the rear axle system of the vehicle. The mean of the difference in the speed of the front axle system and of the rear axle system is transmitted to a band-pass filter 63 via the connection so as to eliminate the phenomenon of mechanical instability. The filtering of the difference in the front speed compared with the rear axle system via a low-pass filter and band-stop filter is used to increase the obstacle-overcoming and drivability capabilities.

The signal transmitted by the band-pass filter is then transmitted to a fourth first-order low-pass filter 65 via the connection 66 making it possible to filter the mean of the difference in the speed of the front axle system and of the rear axle system eliminating any high-frequency noise. The fourth low-pass filter 65 transmits a filtered signal FltFrRrwheelSlip to the fourth module 23 via the connection 49. A third module for computing the mean receives at the input the speeds of the two rear wheels WheelSpeed_RR and WheelSpeed_RL via the connections 26*a* and 27*a* and generates the mean of these speeds. The signal transmitted by the third module 67 for computing the mean is multiplied by the radius of the wheels via the connection 68 in a multiplier 69. The latter transmits a signal via the connection 70 to a fifth first-order low-pass filter 71 making it possible to eliminate any high-frequency noise. At the output of the fifth filter 71, the filtered speed of the vehicle FltVehicleSpeed is transmitted to the fourth module 23 via the connection 46.

Figure 5:
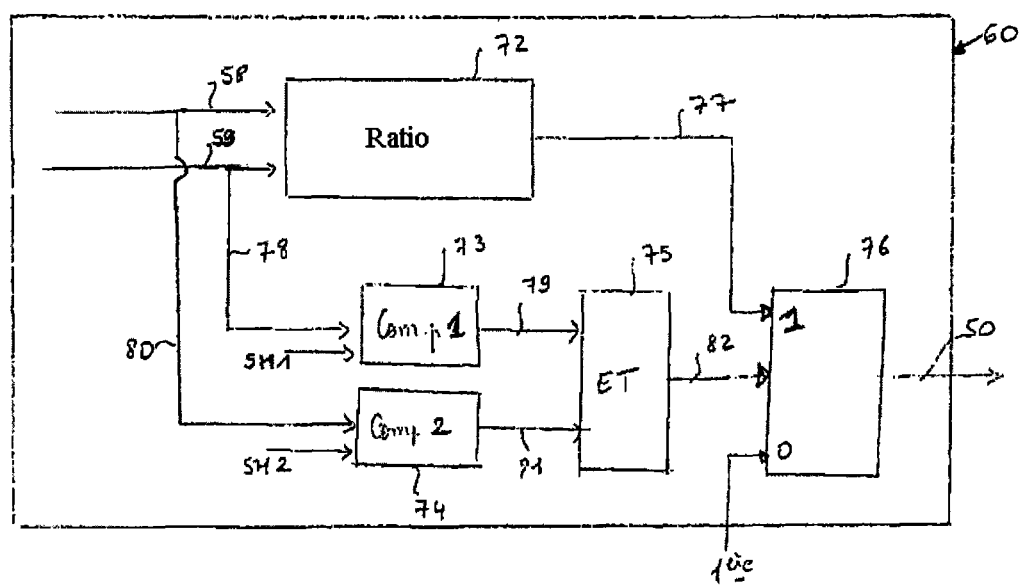
FIG. 5 illustrates an example of determining the engaged gearbox ratio according to the invention.

FIG. 5 shows an example of the determination of the gearbox ratio GearBoxRatio by a module 60 for determining the gearbox ratio. The determination module 60 comprises a divider 72, a first comparator 73, a second comparator 74, a logic "AND" module 75 and a switch 76. The divider 72 receives, via the connections 58 and 59 respectively, the filtered signals relating to the speed of the front axle system FltFrontAxleSpeed and to the filtered speed of the engine FltEngineSpeed. It produces the ratio of these two signals and transmits it via the connection 77 to the switch 76. The filtered speed of the front axle system FltFrontAxleSpeed transmitted via the connection 78 to the first comparator 73 is compared with a first minimum threshold SM1 which then transmits a Boolean signal via the connection 79 to the logic "AND" module 75. The filtered speed of the engine FltEngineSpeed transmitted via the connection 80 to the second comparator 74 is compared with a second minimum threshold SM2 which then transmits a Boolean signal via the connection 81 to the logic "AND" module 75. The logic "AND" module 75 is connected at the input to the switch 76 via the connection 82 and transmits a Boolean signal. If the Boolean signal at the output of the logic "AND" module 75 takes the logic value 1, the engaged gearbox ratio GearBoxRatio transmitted by the switch 76 to the fourth module 23 via the connection 50 is equal to the ratio computed by the divider 72. If the Boolean signal at the output of the logic "AND" module 75 takes the logic value 0, that is to say at low engine speed and/or at low speed of the front axle, the default engaged gearbox ratio is the first.

Figure 6:
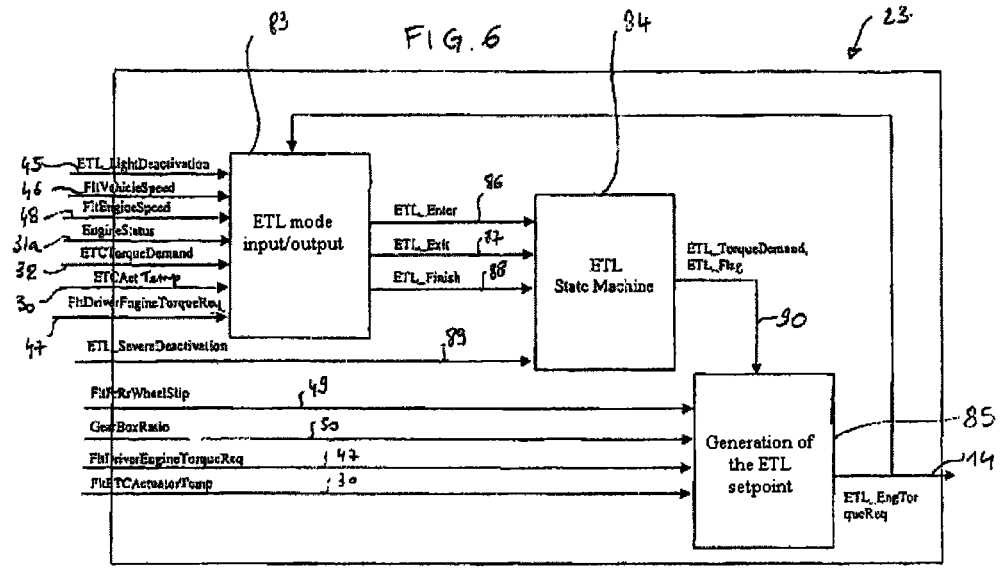
FIG. 6 illustrates an example of determining the engine torque limitation setpoint according to the invention.

FIG. 6 illustrates an exemplary embodiment of the fourth module 23 for determining the engine torque limitation setpoint. It comprises a module 83 for generating the control signals intended for a module 84 for determining the state of the engine torque limitation module and a module 85 for generating the engine torque limitation setpoint. These three modules 83, 84 and 85 are in feedback: the module 85 for generating the engine torque limitation setpoint is connected at the output to the module 83 for generating the control signals.

The module 83 for generating the control signals receives at the input the signal relating to a progressive deactivation originating from the second module 21 ETL_LightDeactivation via the connection 45, the filtered signals originating from the third module relating to the speed of the vehicle FltVehicleSpeed, to the engine speed FltEngineSpeed and to the engine torque requested by the driver FltDriverEngineTorqueReq respectively via the connections 46 to 48, and the signals relating to the estimate of the 4×4 actuator temperature ETC_ActTemp via the connection 30, to the setpoint for transfer of torque to the non-driving axle ETC_TorqueDemand via the connection 32 and to the status of the engine EngineStatus via the connection 31a originating from the first module 20. The module 83 for generating the control signals generates three Boolean control signals for activation and deactivation as a function of certain conditions which may or may not be verified by the input signals: an inactivity signal ETL_Exit of the engine torque limitation module, an activity signal ETL_Enter of the engine torque limitation module and the finish signal ETL_Finish for finishing the engine torque limitation request transmitted respectively via the connections 86 to 88 to the state determination module 84.

The inactivity signal ETL_Exit of the engine torque limitation module is true if all the conditions for being in engine torque limitation mode are not respected. In our example, ETL_Exit is true if the signal relating to an immediate deactivation ETL_SevereDeactivation is true or if the signal relating to a progressive deactivation ETL_LightDeactivation is true, or if the filtered speed of the vehicle is higher than a certain maximum threshold, or if the engine is not running, or if the filtered engine speed FltEngineSpeed is below a certain minimum threshold, or if the setpoint for transfer of torque to the non-driving axle ETC_TorqueDemand is below a certain minimum threshold or if the 4×4 actuator temperature ETC_ActTemp is below a certain minimum threshold or if the vehicle mode ETC_Mode is a "4×2 mode". If at least one of these conditions is verified, the engine torque limitation is stopped. It should be noted that, depending on the type of service desired, one or more of these conditions may be changed. For example, if it is desired that the engine torque limitation module 2 is always available irrespective of the speed of the vehicle, the condition relating to the speed can be deleted. This deletion can be carried out simply by calibration by placing a speed threshold higher than the maximum speed of the vehicle.

The activity signal ETL_Enter of the engine torque limitation module is true if the engine torque limitation mode is active. In our example, ETL_Enter is true when the deactivation signals ETL_SevereDeactivation and ETL_LightDeactivation are false and if the inactivity signal ETL_Exit is false and if the filtered speed of the vehicle is below a minimum threshold and if the vehicle is running and if the filtered engine speed is higher than a maximum threshold, and if the setpoint for transfer of torque to the non-driving axle ETC_TorqueDemand is higher than a certain maximum threshold and if the 4×4 actuator temperature ETC_ActTemp is higher than a certain maximum threshold and if the vehicle mode ETC_Mode is not "4×2 mode".

The finish signal ETL_Finish for finishing engine torque limitation is true if the engine torque setpoint determined by the module 85 for generating the engine torque setpoint is higher than or equal to the filtered signal of the engine torque requested by the driver FltDriverEngineTorqueReq or if the state of the engine torque limitation module is active for more than a certain period called TimeOut.

The module for determining the state of the module 84 is a state machine connected at the output to the module 83 for generating the control signals and receives the three signals described above via the connections 86 to 88 and the signal relating to an immediate deactivation of the module ETL_SevereDeactivation via the connection 89. Depending on these input signals, the module 84 for determining the state of the module generates a first signal ETL_State giving the state of the system. This signal ETL_State is shared between the various modules of the fourth module 23.

Four main states can be considered:

A "no engine torque limitation request" state represented by a zero value of ETL_State which is established when the signal relating to an immediate deactivation ETL_SevereDeactivation is true.

A "wait" state represented by ETL_State equal to 1 when the signal relating to an immediate deactivation ETL_SevereDeactivation is false, the activity signal ETL_Enter is false. Specifically, this wait state exists if all the conditions for making an engine torque limitation request are not satisfied.

An "engine torque limitation possible" state represented by a value of ETL_State equal to 2 which is established when the signal relating to an immediate deactivation ETL_SevereDeactivation is false, the activity signal ETL_Enter is true and the inactivity signal ETL_Exit is false.

A state that promotes the request of the driver in which "the hand is given to the driver" represented by a value of ETL_State equal to 3 is established when the signal relating to an immediate deactivation ETL_SevereDeactivation is false, the activity signal ETL_Enter is false or the inactivity signal ETL_Exit is true and if the finish limitation signal ETL_Finish is false. This state exists when all the conditions for making an engine torque limitation request are not satisfied. The hand is given back progressively to the driver. The target torque is then the torque requested by the driver represented by the signal FltDriverEngineTorqueDemand.

Depending on the state of the engine torque limitation module represented by the variable ETL_State, the module 84 for determining the state of the engine torque limitation module generates a first and a second Boolean signal intended for the module for generating the engine torque limitation setpoint via the connection 90. The first signal ETL_TorqueDemand is a signal relating to a real request to limit the engine torque and the second signal ETL_Flag can be defined as the signal giving an item of information on the ability of the system to respond to the engine torque limitation request. An example of a method of determination of the state of the system via the module for determining the state of the module 84 is described in FIG. 7.

The module 85 for generating the engine torque limitation setpoint is connected at the output to the module 84 for determining the state of the engine torque limitation module and receives at the input the two Boolean signals relating to the system state ETL_TorqueDemand and ETL_Flag via the connection 90 but also the filtered signal for front-rear wheel slip FltFrRrWheelSlip via the connection 49, the engaged gearbox ratio GearBoxRatio via the connection 50, the filtered signal relating to the engine torque request of the driver FltDriverEngineTorqueReq via the connection 47 and the estimate of the 4×4 controlled actuator temperature ETC_ActuatorTemp via the connection 30. The implementation of the engine torque limitation setpoint ETL_EngTorqueReq at the output of the module 85 for generating the engine torque limitation setpoint is therefore a function of the actuator temperature ETC_ActuatorTemp.

The fourth module 23 therefore transmits at the output an engine torque limitation setpoint which evolves as a function of the system state and therefore of time. The setting to a feedback of the modules of the fourth module 23 makes it possible to check the engine torque limitation setpoint as a function of the various parameters of the vehicle.

Figure 7:
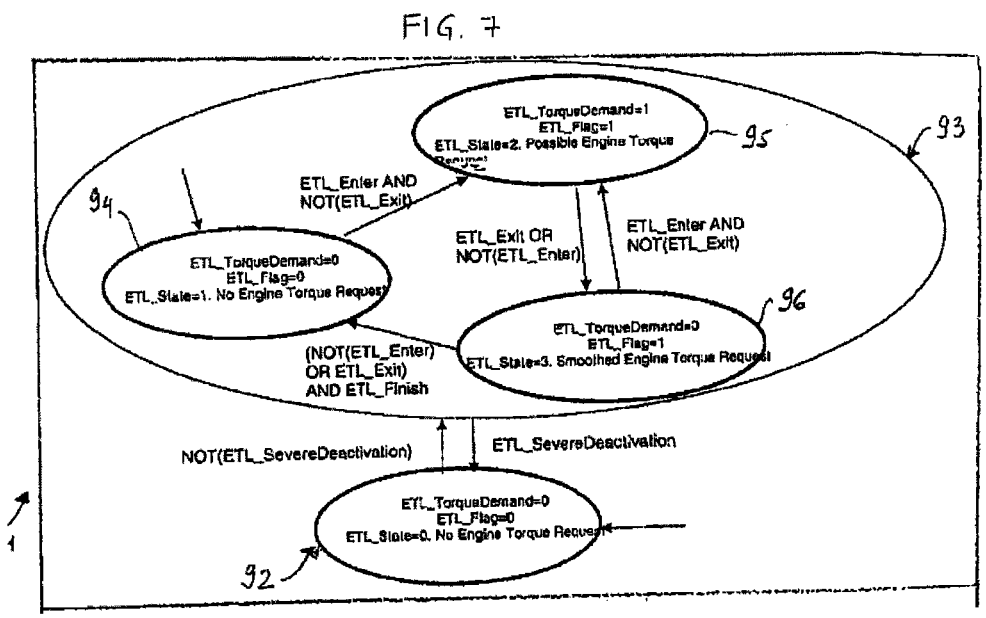
FIG. 7 illustrates an example of the method for determining the state of the module for determining the setpoint according to the invention.

FIG. 7 illustrates an example of the method for determining the two Boolean signals at the output of the module 84 for determining the state of the engine torque limitation module via the connection 90. It takes account of the four previously defined states represented by the variable ETL_State. The method 86 comprises an initialization step 92 and a cycle 93. When an immediate deactivation is carried out (ETL_SevereDeactivation is true), the zero value of the state variable ETL_State corresponds to an absence of an engine torque limitation request. There is no real engine torque limitation request, the signal ETL_TorqueDemand then takes the zero value. Moreover, the system is not capable of responding to an engine torque limitation request, the signal ETL_Flag therefore takes a zero value. Specifically, when the engine torque limitation module is deactivated immediately, there can be no engine torque reduction request. This case forms the initialization step 92 of the method 91.

If there is no immediate deactivation, the cycle 93 is carried out. It comprises a first step 94 when ETL_State takes the value 1. During this first step 94, since the conditions for making a request are not satisfied, such as for example too high a vehicle speed, ETL_TorqueDemand and ETL_Flag take a zero value. If the conditions for making a request are satisfied, the system moves on to the second step 95: ETL_State takes the value 2 and the signal relating to an engine torque limitation request ETL_TorqueDemand and the signal of the ability of the system to respond to this request ETL_Flag take the value 1. If the conditions for making an engine torque limitation request are no longer satisfied, the system moves on to the third step 96: ETL_State takes the value 3, the signal relating to an engine torque limitation request ETL_TorqueDemand is zero. The hand is given to the driver to limit the engine torque but an engine torque limitation is possible because of the system state, the signal ETL_Flag takes the value 1. If, when in the third step 96, that is to say that ETL_State is equal to 3, the system state no longer makes it possible to make a request (vehicle speed too high for example), the system moves on to the first step 94: ETL_State switches to the value 1 and the state is a "wait" state. It is also possible to move on from the third step 96 to the second step 95 when the torque requested by the driver is greater than the engine torque setpoint. Therefore, the engine torque can be limited only when ETL_Flag equals 1.

Figure 8:
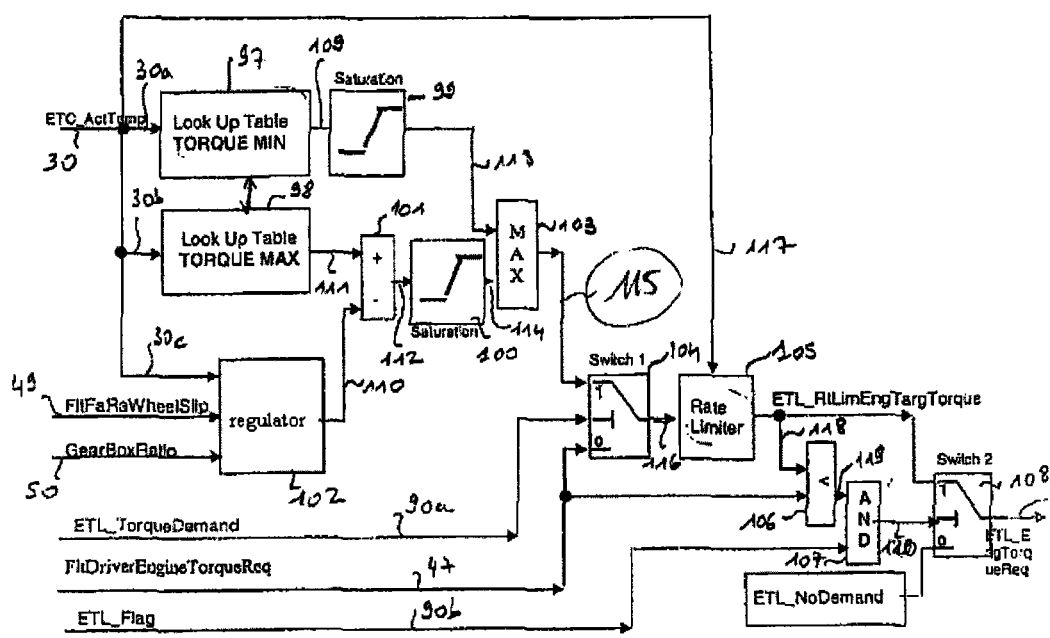
FIG. 8 illustrates a possible embodiment of the engine torque limitation setpoint according to the invention.

FIG. 8 illustrates a possible implementation of the engine torque reduction setpoint ETL_EngTorqueReq. The module 85 for generating the engine torque limitation setpoint comprises a minimum torque threshold table 97, a maximum torque threshold table 98, a first saturation block 99, a second saturation block 100, a subtractor 101, a regulator 102, a means 103 for determining the maximum of values, a first switch 104, a threshold limiter 105, a comparator 106, a logic "AND" module 107 and a second switch 108.

The minimum torque threshold table 97 and the maximum torque threshold table 98 have as their input the estimate of the actuator temperature ETC_ActTemp via the connection 30*a*. At any time, the engine torque setpoint is limited between two values TorqueMin and TorqueMax which are a function of the actuator temperature ETC_ActTemp. For this the lower threshold determined by the minimum torque threshold table 97 constitutes an input signal of the first saturation block 99 via the connection 109 which limits the output value of the minimum threshold table TorqueMin to a calibrated value P_EngTorqueReqMin. The regulator 102 receives at the input the estimate of the actuator temperature ETC_ActTemp via the connection 30*c*, the engaged gear box ratio GearBoxRatio via the connection and the filtered difference in speed between the driving axle and the non-driving axle FltFrRrWheelSlip via the connection 49. It makes it possible to have an intrusive adjustment for the intermediate temperatures of the actuator or, on the contrary, to have an adjustment with a maximum of effectiveness and perceptible in the case of critical temperature of the actuator.

The dependence relative to the engaged gearbox ratio is necessary if consideration is given to the stability of the system. After regulation, the output signal of the regulator 102 is transmitted to the subtractor 101 via the connection 110 and is subtracted from the maximum engine torque TorqueMax by the subtractor 101.

The maximum engine torque is transmitted via the connection 111, by the maximum torque threshold table 98 having received the estimate of actuator temperature ETC_TempAct via the connection 30*b*. The result of this subtraction is at the input of the second saturation block 100, via the connection 112, which limits the value at the output of the subtractor 101 to a calibrated value P_EngTorqueReqMax. These two parameters P_EngTorqueReqMax and P_EngTorqueReqMin are parameters for adjustment of the saturation function.

The means 103 for determining the maximum of values receives at the input the regulated maximum value and the engine torque minimum value TorqueMin and TorqueMaxReg respectively via the connection means 113 and 114. It transmits at the output an engine torque setpoint ETL_EngTargTorque that is between the parameters P_EngTorqueReqMin and P_EngTorqueReqMax to the first switch 104 via the connection 115 which, depending on the value of the Boolean signal ETL_TorqueDemand received via the connection 90*a* will send this engine torque setpoint or that requested by the driver FltDriverEngineTorqueDemand. If ETL_TorqueDemand is equal to 1, then the target torque is ETL_EngTargTorque, a function of the actuator temperature ETC_ActTemp, of the front-rear wheel slip FltFrRrWheelSlip and of the engaged ratio GearBoxRatio, otherwise the target torque is the torque requested by the driver.

The engine torque ETL_EngTargTorque transmitted by the means 103 for determining the maximum of values constitutes an input of the limiter 105 via the connection 116 which also receives the value of the actuator temperature ETC_ActTemp via the connection 117 and which limits the variations over time of the engine torque setpoint ETL_EngTargTorque as a function of the actuator temperature. For example, at high temperature, greater variations can be tolerated.

The limiter 105 transmits at the output a limited engine torque setpoint ETL_RtLimEngTargTorque which, at the input via the connection 118 is compared in the comparator 106 with the engine torque setpoint request of the driver FltDriverEngineTorqueReq.

The comparator 106 transmits a Boolean signal. This Boolean signal is at the input of the logic "AND" module 107 via the connection 119. The Boolean signal ETL_flag is at the input via the connection 90*b* of the logic "AND" module 107.

The logic "AND" module 107 transmits a Boolean signal to the second switch 108 via the connection 120. The second switch 108 transmits, as a function of the torque requested by the driver and the system state, an engine torque setpoint via the connection 114.

If the output of the logic "AND" module 107 is equal to 1, that is to say if the torque requested by the driver is greater than the torque computed by the regulator and if ETL_flag is equal to 1, then the engine torque is limited and the engine torque setpoint is equal to ETL_RtLimEngTargTorque and otherwise no engine torque request is made.

There, the limitation of engine torque, making it possible to maximize the ability to overcome obstacles and drivability of a vehicle furnished with a controlled 4×4 system, depends on the driving situation and the state of the 4×4 system.

Moreover, it is protected by virtue of a robust data interchange between the engine control means and the actuator control means, of a deactivation that is dependent on the seriousness of a failure, and of an engine torque limitation that is always below or equal to the torque requested by the driver. Moreover, this engine torque limitation is a function of the estimated or measured temperature of the actuator.

Specifically, a maximum engine torque setpoint making possible a preventive action and a minimum engine torque setpoint making possible a remedial action are a function of the actuator temperature.

Similarly, this engine torque limitation is a function of the engaged ratio with a maximum engine torque setpoint and a minimum engine torque setpoint dependent on the engaged ratio.

Finally, the engine torque limitation thus determined makes it possible to give the hand back to the driver progressively by virtue of a mechanism limiting the variations in torque over time.

This mechanism for limiting the variations in torque is a function of the actuator temperature as shown in FIG. 8. At low temperature, the comfort and capability to overcome obstacles take precedence; at high temperature, the behavior and availability of the actuator take precedence.

The invention claimed is:

1. A system for limiting engine torque of an internal combustion engine of a motor vehicle with a four-wheel-drive traction system, comprising:
   an actuator controlled and configured to distribute engine torque of the internal combustion engine to drive wheels of the motor vehicle;
   computing means for computing at least one variable characteristic of an operation of the motor vehicle;
   a module for limiting the engine torque of the internal combustion engine as a function of the at least one variable characteristic, the module for limiting engine torque of the internal combustion engine including:
      means for generating an engine torque limitation setpoint to actuate the module for limiting engine torque of the internal combustion engine, and
      means for deactivating the module for limiting engine torque of the internal combustion engine as a function of the at least one variable characteristic of the operation of the motor vehicle and for progressively limiting variations of the engine torque of the internal combustion engine over time as a function of temperature of the actuator,
   wherein the means for deactivating the module for limiting engine torque of the internal combustion engine is configured to selectively generate a first deactivation signal for an immediate deactivation of the module for limiting engine torque of the internal combustion engine and a second deactivation signal for a progressive deactivation of the module for limiting engine torque of the internal combustion engine, and
   wherein the at least one variable characteristic of the operation of the motor vehicle is different from the temperature of the actuator.

2. The system as claimed in claim 1, wherein input signals of the module for limiting engine torque of the internal combustion engine are a characteristic of a driving situation and of an operating state of the four-wheel-drive traction system of the motor vehicle.

3. The system as claimed in claim 1, further comprising processing means for filtering input signals and for determining an engaged gearbox transmission ratio intended for the means for generating the engine torque limitation setpoint.

4. The system as claimed in claim 1, wherein the means for generating the engine torque limitation setpoint includes:
   a module for detecting limitation conditions and which is configured to deliver control signals for activation and deactivation of the module for limiting engine torque of the internal combustion engine, and
   a setpoint-generation module for generating an engine torque setpoint signal.

5. The system as claimed in claim 4, wherein the module for detecting limitation conditions is configured to deliver control signals as a function of a value of the at least one variable characteristic of the operation of the motor vehicle and of activation and deactivation signals.

6. A method for limiting engine torque of an internal combustion engine of a motor vehicle with a four-wheel-drive traction system and including an actuator controlled and configured to distribute the engine torque of the internal combustion engine to drive wheels of the motor vehicle, the method comprising:
   computing at least one variable characteristic of an operation of the motor vehicle; and
   limiting the engine torque of the internal combustion engine as a function of the at least one variable characteristic,
   wherein the engine torque of the internal combustion engine is controlled around an engine torque limitation setpoint, said limiting the engine torque of the internal combustion engine being deactivated as a function of the at least one variable characteristic of the operation of the motor vehicle,
   wherein variations in the engine torque of the internal combustion engine are limited progressively over time as a function of temperature of the actuator,
   wherein the deactivation of said limiting the engine torque of the internal combustion engine includes selectively generating a first deactivation signal for immediate deactivation and a second deactivation signal for progressive deactivation, and
   wherein the at least one variable characteristic of the operation of the motor vehicle is different from the temperature of the actuator.

7. The method as claimed in claim 6, further comprising:
   detecting limitation conditions;
   delivering control signals to control activation and deactivation of said limiting the engine torque of the internal combustion engine; and
   generating an engine torque setpoint.

8. The method as claimed in claim 7, wherein the control signals are delivered as a function of a value of the at least one variable characteristic of the operation of the motor vehicle and of activation and deactivation signals.

9. A system for limiting engine torque of an internal combustion engine of a motor vehicle with a four-wheel-drive traction system, comprising:
   an actuator configured to be controlled so as to distribute engine torque of the internal combustion engine to drive wheels of the motor vehicle; and circuitry configured to
compute at least one variable characteristic of an operation of the motor vehicle,
limit the engine torque of the internal combustion engine as a function of the at least one variable characteristic and based on a generated engine torque limitation setpoint to initiate limiting of the engine torque of the internal combustion engine, and
deactivate the limiting of the engine torque of the internal combustion engine as a function of the at least one variable characteristic of the operation of the motor vehicle,
wherein the deactivation includes selectively generating a first deactivation signal for immediate deactivation of the limiting of the engine torque of the internal combustion engine and a second deactivation signal for progressive deactivation of the limiting of the engine torque of the internal combustion engine.

10. The system as claimed in claim 9, wherein the at least one variable characteristic of the operation of the motor vehicle is different from a temperature of the actuator.

11. The system as claimed in claim 9, wherein input signals of the circuitry include a characteristic of a driving situation and of an operating state of the four-wheel-drive traction system of the motor vehicle.

12. The system as claimed in claim 9, wherein the circuitry is configured to progressively limit variations of the engine torque of the internal combustion engine over time as a function of the temperature of the actuator.

13. The system as claimed in claim 9, wherein the circuitry is configured to
input signals, and
determine an intended engaged gearbox transmission ratio to generate the engine torque limitation setpoint.

14. The system as claimed in claim 9, wherein the circuitry is configured to
generate the engine torque limitation setpoint,
detect limitation conditions,
deliver control signals for activation and deactivation of the limiting of engine torque of the internal combustion engine, and
generate an engine torque setpoint signal.

15. The system as claimed in claim 14, wherein the circuitry is configured to deliver control signals as a function of a value of the at least one variable characteristic of the operation of the motor vehicle and of activation and deactivation signals.

* * * * *